(12) United States Patent
Chen et al.

(10) Patent No.: US 9,118,577 B2
(45) Date of Patent: Aug. 25, 2015

(54) AUTOMATIC METHOD FOR SETTING UP MLDP LSP THROUGH P2P TUNNEL

(75) Inventors: Ying Chen, Santa Clara, CA (US); Qianglin Quintin Zhao, Boxborough, MA (US)

(73) Assignee: Futurewei Technologies, Inc., Plano, TX (US)

( * ) Notice: Subject to any disclaimer, the term of this patent is extended or adjusted under 35 U.S.C. 154(b) by 412 days.

(21) Appl. No.: 13/465,792

(22) Filed: May 7, 2012

(65) Prior Publication Data

US 2013/0294455 A1 Nov. 7, 2013

(51) Int. Cl.
*H04L 12/28* (2006.01)
*H04L 12/761* (2013.01)
*H04L 12/723* (2013.01)

(52) U.S. Cl.
CPC .............. *H04L 45/16* (2013.01); *H04L 45/507* (2013.01)

(58) Field of Classification Search
None
See application file for complete search history.

(56) References Cited

U.S. PATENT DOCUMENTS

| | | | |
|---|---|---|---|
| 7,477,642 B2 * | 1/2009 | Aggarwal et al. | 370/390 |
| 7,602,702 B1 * | 10/2009 | Aggarwal | 370/217 |
| 2007/0217428 A1 * | 9/2007 | Wijnands et al. | 370/395.5 |
| 2007/0237097 A1 * | 10/2007 | Maharana et al. | 370/255 |
| 2009/0268731 A1 * | 10/2009 | Narayanan et al. | 370/390 |
| 2010/0232316 A1 * | 9/2010 | Takacs | 370/254 |
| 2012/0027013 A1 * | 2/2012 | Napierala | 370/390 |
| 2012/0069745 A1 * | 3/2012 | Kini et al. | 370/252 |

OTHER PUBLICATIONS

Bradner, S., "Key Words for Use in RFCs to Indicate Requirement Levels," RFC 2119, Mar. 1997, 3 pages.
Rosen, et al., "Multiprotocol Label Switching Architecture," RFC 3031, Jan. 2001, 57 pages.
Anderson, L., et al., "LDP Specification," RFC 5036, Oct. 2007, 127 pages.
Thomas, B., et al., "LDP Capabilities," RFC 5561, Jul. 2009, 13 pages.
Le Roux, J., Ed., et al., "Requirements for Point-to-Multipoint Extensions to the Label Distribution Protocol," RFC 6348, Sep. 2011, 21 pages.
Wijnands, IJ., Ed., et al., "Label Distribution Protocol Extensions for Point-to-Multipoint and Multipoint-to-Multipoint Label Switched Paths," RFC 6388, Nov. 2011, 40 pages.
Zhao, Q., et al., "LDP Extensions for Multi Topology Routing," draft-ietf-mpls-ldp-multi-topology-03.txt, Mar. 11, 2012, 18 pages.
Chen, E., et al., "Deploying mLDP Through P2P LSP Tunnels," draft-chen-mpls-mldp-deployment-via-p2p-tunnels-00.txt, Oct. 25, 2011, 10 pages.
Andersson, et al., "The Multiprotocol Label Switching (MPLS) Working Group Decision on MPLS Signaling Protocols," RFC 3468, Feb. 2003, 11 pages.
Napierala, et al., "Using LDP Multipoint Extensions on Targeted LDP Sessions," draft-napierala-mpls-targeted-mldp-03, Apr. 20, 2012, 9 pages.

\* cited by examiner

*Primary Examiner* — Kwang B Yao
*Assistant Examiner* — Hardikkumar Patel
(74) *Attorney, Agent, or Firm* — Conley Rose, P.C.; Grant Rodolph

(57) ABSTRACT

An apparatus comprising a processor configured to send a first notification message to a first label switch router (LSR) to discover the upstream multipoint Label Distribution Protocol (mLDP) LSR, wherein the apparatus is configured to couple to the first LSR, and wherein the first LSR is not an mLDP LSR, receive a second notification message from the upstream mLDP node, and in response to receiving the second notification message, establish an mLDP Label Switch Path (LSP) to the upstream mLDP node via the first LSR.

23 Claims, 8 Drawing Sheets

AUTOMATIC METHOD FOR SETTING UP MLDP LSP THROUGH P2P TUNNEL

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Label Distribution Protocol (LDP) can be used to set up Point-to-Multipoint (P2MP) and Multipoint-to-Multipoint (MP2MP) Label Switched Paths (LSPs). The set of LDP extensions for setting up P2MP or MP2MP LSPs may be referred to as multipoint LDP (mLDP), which may be specified in Internet Engineering Task Force (IETF) Request for Comments (RFC) 6388, entitled "Label Distribution Protocol Extensions for Point-to-Multipoint and Multipoint-to-Multipoint Label Switched Paths", which is hereby incorporated by reference. Conventional mLDP systems and methods, such as those based on RFC 6388, may require that all nodes along a path support P2MP or MP2MP capability (i.e., multipoint capability) in order for an mLDP path to be established. For example, conventional mLDP systems may not use P2MP or MP2MP capability over a path where the transit nodes along path to a root node do not support mLDP capability. However, in actual deployments some the nodes along the LSP path may not be P2MP or MP2MP capable (i.e., some nodes may only be capable of point-to-point (P2P) communication). Thus, conventional techniques may require that any existing P2P nodes be replaced by P2MP or MP2MP nodes in order to implement multipoint communication capability, which may be an exceedingly time-consuming and/or an overly costly replacement.

SUMMARY

In one aspect, the invention includes an apparatus comprising a processor configured to send a first notification message to a first label switch router (LSR) to discover the upstream mLDP LSR, wherein the apparatus is configured to couple to the first LSR, and wherein the first LSR is not an mLDP LSR, receive a second notification message from the upstream mLDP node, and in response to receiving the second notification message, establish an mLDP LSP to the upstream mLDP node via the first LSR.

In another aspect, the invention includes a method comprising sending, from a node, a first notification message to a first LSR to discover the upstream mLDP LSR, wherein the first LSR is coupled to the node and is not an mLDP LSR, receiving a second notification message from the upstream mLDP node; and in response to receiving the second notification message, establishing an mLDP LSP with the upstream mLDP node via the first LSR.

In yet another aspect, the invention includes an apparatus comprising at least one ingress port, at least one egress port; and a processor coupled to the at least one ingress port and the at least one egress port, wherein the processor, the at least one ingress port, and the at least one egress port are configured to provide a mLDP LSP between two mLDP LSRs, and wherein the apparatus is not an mLDP LSR.

In yet another aspect, the invention includes a method comprising receiving an advertisement message from an upstream LSR indicating that the upstream LSR is a lightweight mLDP LSR, and sending a first notification message by an upstream mLDP source node to the upstream LSR, wherein the first notification message is configured to direct an mLDP LSR to establish an mLDP LSP with the upstream mLDP source.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are methods, apparatuses, and systems for P2MP or MP2MP communications along paths that employ at least one P2P node. Some embodiments are for finding a first upstream node on a path which supports P2MP/MP2MP LDP along the path from a current node to a root node. An mLDP LSP may be established via a P2P tunnel through P2P nodes. Service providers may upgrade a network gradually by upgrading less than all nodes of an existing network on a control plane and a forwarding plane so that the nodes are multipoint capable. For the remaining nodes, methods, apparatuses, and systems disclosed herein may require only minor signaling plane changes without significant changes to the forwarding plane. Thus, a capital expenditure (CapEx) of a deployment can be reduced or the deployment of LDP P2MP/MP2MP capability can be performed in phases instead of updating an entire network. Consequently, the methods, apparatuses, and systems disclosed herein may reduce the CapEx for service providers who do not need to update every node of their networks to support mLDP.

Figure 1:
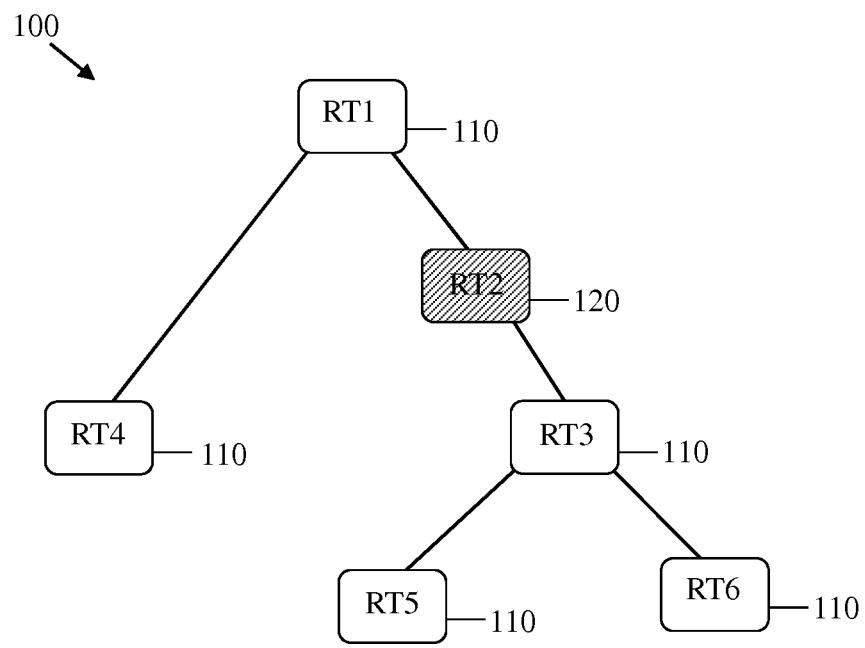
FIG. 1 is an embodiment of a network with P2P and mLDP nodes.

FIG. 1 is an embodiment of a network 100 with mLDP nodes 110 and a P2P LDP node 120 interconnected by links as shown. The links between nodes may comprise fiber, coaxial cable, or any other waveguide or material for conveying data from one node to another. Each of the mLDP nodes 110 may be a label switched router (LSR) with mLDP capability. The P2P LDP node 120 may be an LSR that does not have full mLDP capability (i.e., the P2P LDP node 120 has only P2P capability and may not fully comply with RFC 6388), but the P2P LDP node 120 may have some extra capability beyond a conventional P2P node in that it may act as a bridge between mLDP nodes as described further below (as such, the P2P LDP node 120 may be referred to as having lightweight mLDP capability or P2P tunnel-through mode capability). Node 110 labeled as router 1 (RT1) may be a root node that couples the network 100 to a multicast source. A root node may be an ingress router of a multipoint label-switched core network (i.e., downstream traffic from a multicast source may pass through the root node to reach other nodes in a core network). If mLDP node RT3 110 needs to set up an mLDP LSP (e.g. to receive data or content), the path necessarily must pass through P2P LDP node 120 RT2 and include root node RT1 110 according to the topology of FIG. 1. Conventional techniques may not allow nodes RT3 110 and RT1 110 to establish an mLDP LSP because a P2P node RT2 120 may be included. New techniques disclosed herein allow an mLDP LSP to be established between RT1 110 and RT3 110. Note that RT1 110 is a root node for illustrative purposes but may instead be an mLDP-capable node that is not a root node.

Each of the nodes 110 and 120 advertises its capability either as an mLDP LSR (in the case of nodes 110) or a lightweight mLDP LSR (in the case of node 120). The advertisements may comprise advertisement messages transmitted to LDP peers. Generally, the capability of an mLDP or lightweight mLDP router may be advertised among LDP peers. If one router has not received an mLDP tunnel capability advertisement from its neighbor, the router should not send mLDP tunnel-related messages to this neighbor. If a router not having mLDP capability receives one or more mLDP tunnel message the router may send an error message to the sender. Also if a router has not advertised mLDP P2P tunnel-through capability, and the router receives one or more mLDP tunnel-related messages, then the router will treat this error as same as it treats for other unrecognized messages. Once RT3 110 discovers RT1 110 as an upstream mLDP-capable node, RT3 110 may send an mLDP label advertisement message to RT1 110.

Figure 2:
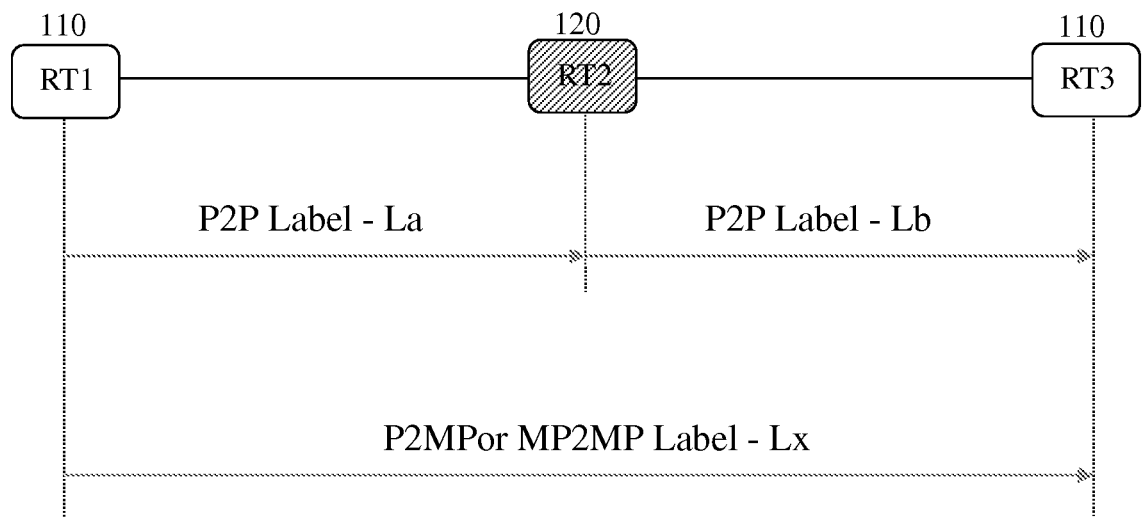
FIG. 2 is an illustration of an embodiment of a label stack in an mLDP LSP established via a P2P tunnel.

FIG. 2 is an illustration of an embodiment of a label stack in an mLDP LSP established via a P2P tunnel. As in FIG. 1, for illustration the mLDP LSP involves two mLDP LSRs 110 and a P2P LSR 120 connected between the mLDP LSRs 110. As shown in FIG. 2, the label stack comprises an mLDP label as an inner label, and a P2P label as an outer label. P2P labels may be advertised hop by hop once the P2P tunnel is triggered or configured. The mLDP label may be advertised through an LDP targeted session. The P2P LSR 120 is a lightweight mLDP LSR (e.g., the P2P LSR 120 may not fully comply with RFC 6388). The P2P LSR 120 may be configured to receive packets comprising P2P labels and mLDP labels and transmit corresponding packets with different P2P labels without changing the mLDP labels. For example, the P2P LSR 120 may receive a first mLDP packet comprising a first P2P label La as an outer label, an mLDP label Lx as an inner label, and a message contents, and the P2P LSR 120 may transmit a second mLDP packet comprising a second P2P label Lb as an outer label, the mLDP label Lx, and the message contents. LSR 120 may process the outer label by replacing La with Lb. The mLDP label Lx may be viewed by LSR 120 as part of the message contents. As such, the P2P LSR 120 may act as an mLDP tunnel or bridge between mLDP LSRs 110 without having full mLDP capability. The mLDP label Lx is a new label added according to the present disclosure. If RT2 120 instead was fully mLDP-capable, label Lx would not be included and only labels La and Lb would be needed on an mLDP LSP, and the labels La and Lb would be mLDP labels.

Figure 3:
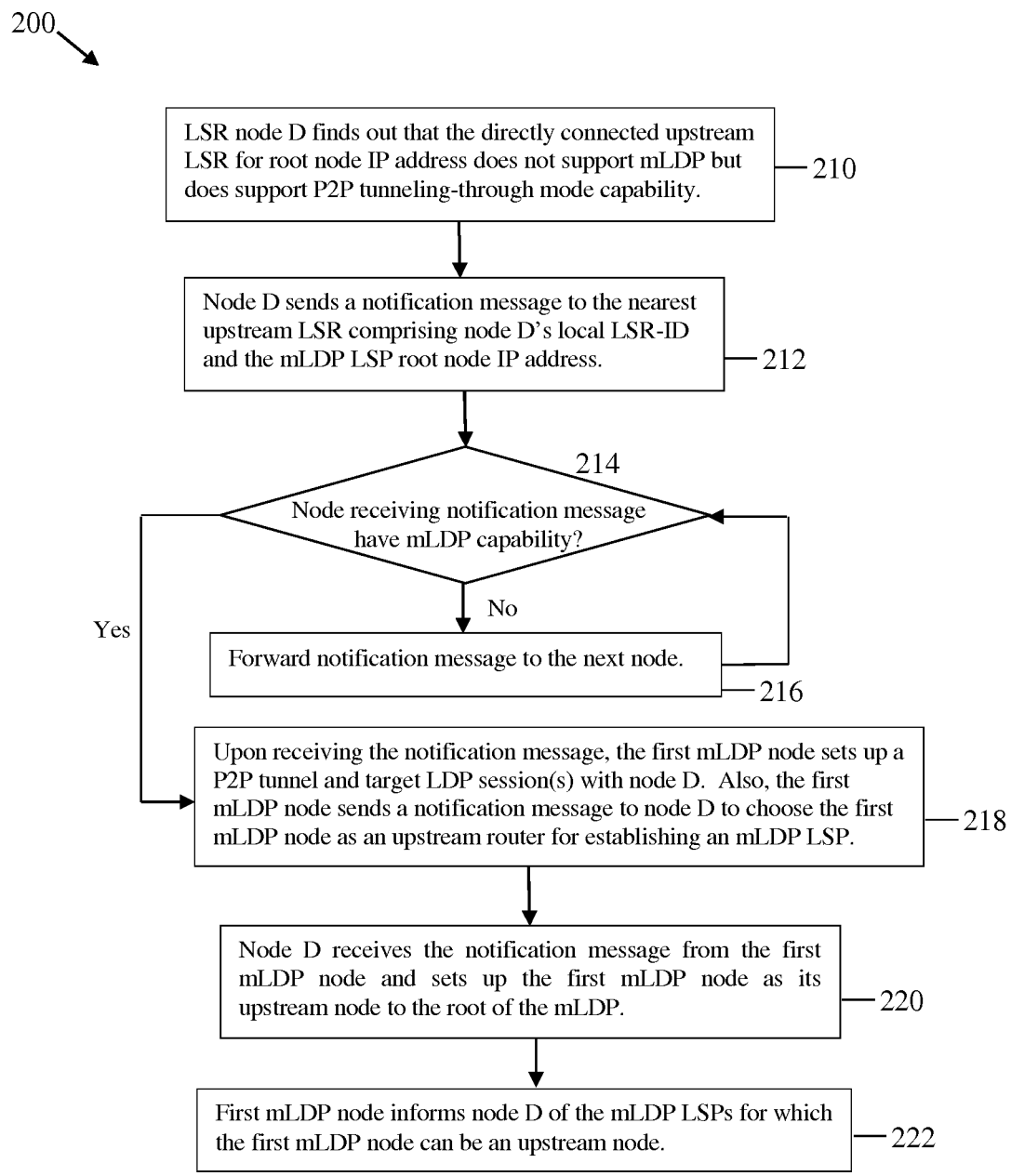
FIG. 3 is an embodiment of a method for establishing an mLDP LSP through a P2P tunnel.

FIG. 3 is an embodiment of a method 200 for establishing an mLDP LSP through a P2P tunnel. In the description, the terms "node," "LSR," and "LSR node" may be used interchangeably. In step 210, LSR node D may find out that the directly connected upstream LSR for a path to root node Internet Protocol (IP) address does not support mLDP but does support P2P tunnel-through mode capability. Node D may determine this information by receiving a capability advertisement message from the directly connected upstream LSR. In step 212, node D sends a notification message to the directly connected upstream LSR. The notification message may comprise the local LSR-ID of node D, which identifies node D, and an IP address of the mLDP LSP root node. In step 214, a determination is made whether the node receiving the notification message has mLDP capability. If not, in step 216 a notification message comprising the LSR-ID and IP address of the mLDP LSP root node is forwarded to the next node, which may be determined from the root node IP address. If a node receiving the notification message in step 214 has mLDP capability, the method proceeds to step 218. In step 218, upon receiving the notification message, the first mLDP-capable node sets up a P2P tunnel (via the intermediate P2P nodes) and target LDP session(s) with node D. Also, the first mLDP-capable node (hereafter first mLDP node) sends a notification message to node D to choose the first mLDP node as an upstream router for establishing an mLDP LSP. In step 220, node D receives the notification message from the first mLDP node, and node D sets up the first mLDP node as its upstream node to the root node of the mLDP LSP. In step 222, the first mLDP node informs node D of the mLDP LSPs for which the first mLDP node can be an upstream node. Any intermediate P2P nodes between node D and the first upstream mLDP node act as bridges between these two nodes by forwarding mLDP packets between the mLDP nodes.

As example of the operation of method 200, referring to FIG. 1, suppose that RT3 110 is node D in method 200 and RT1 110 is a root node. In step 210, RT3 110 finds out that the directly connect upstream LSR (i.e., RT2 120) does not support mLDP. In step 212, RT3 110 sends a notification message to RT2 120 comprising RT3's LSR-ID and the IP address of RT1 110 (because RT1 110 is the root node in this case). In step 214, RT2 120 determines that it does not have mLDP capability and therefore forwards the notification message to the next node, which is RT1 110, and the method 200 returns to step 214. In step 214, node RT1 110 determines that it has mLDP capability, and the method 200 continues to step 218. In step 218, upon receiving the notification message from RT2 120, RT1 110 sets up a P2P tunnel via RT2 120 and a target LDP session with RT3 110. RT1 110 sends a notification message to RT3 to choose RT1 110 for establishing an mLDP LSP. In step 220, RT3 110 receives the notification message from RT1 110 and sets up the RT1 110 as its upstream node to the root of the mLSP (in this case, RT1 110 is the root), including sending a label advertisement message to RT1 110. In step 222, RT1 110 informs RT3 110 of the mLDP LSP's for which RT1 110 can be an upstream node. Although an mLDP LSP involving only one P2P LDP node RT2 120 has been discussed, there may be more than one P2P LDP node in an mLDP LSP (e.g., there may be n intermediate P2P nodes on a path between RT1 110 and RT3 110, where n is any positive integer), and such a scenario may be handled by method 200.

Figure 4:
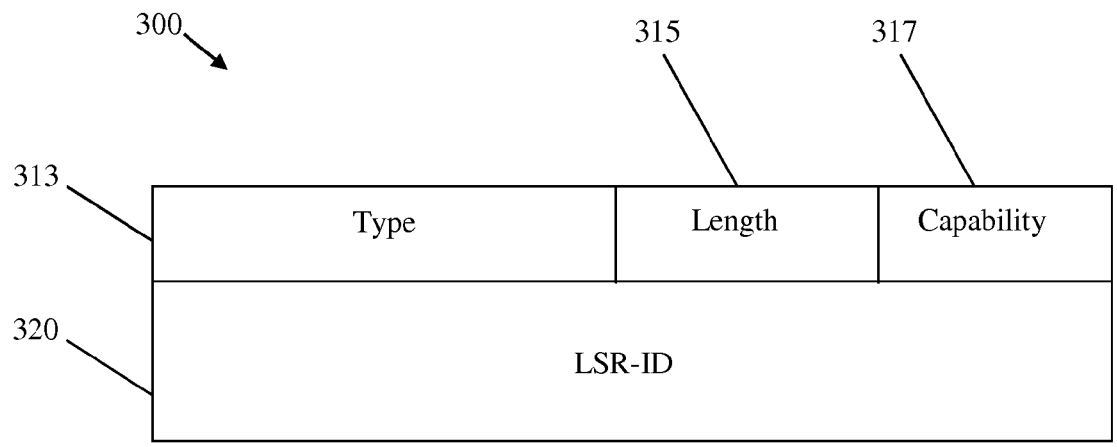
FIG. 4 is an illustration of one embodiment of a first element type.

FIG. 4 is an illustration of one embodiment of a first element type 300, which may be used to notify upstream LSRs of a source of an upstream message. The element type 300 comprises type 313, length 315, and capability 317 fields as well as a field 320 comprising an LSR-ID as shown in FIG. 4. The type field 313 may be a number assigned by the Internet Assigned Numbers Authority (LANA). The type field 313 may be used to indicate that that the message comprises a first element type 300. The length field 315 may be used to indicate the length (in bits or bytes) of the element type 300, excluding the type and length fields 313 and 315, respectively. The capability field 317 may be used to indicate P2MP or MP2MP capability according to RFC 6388. The LSR-ID field 320 may comprise an LSR-ID, which may be used for identifying the LSR which needs a P2P tunnel to setup an mLDP LSP, i.e., LSR-ID may be an identifier of a source of an upstream message.

Figure 5:
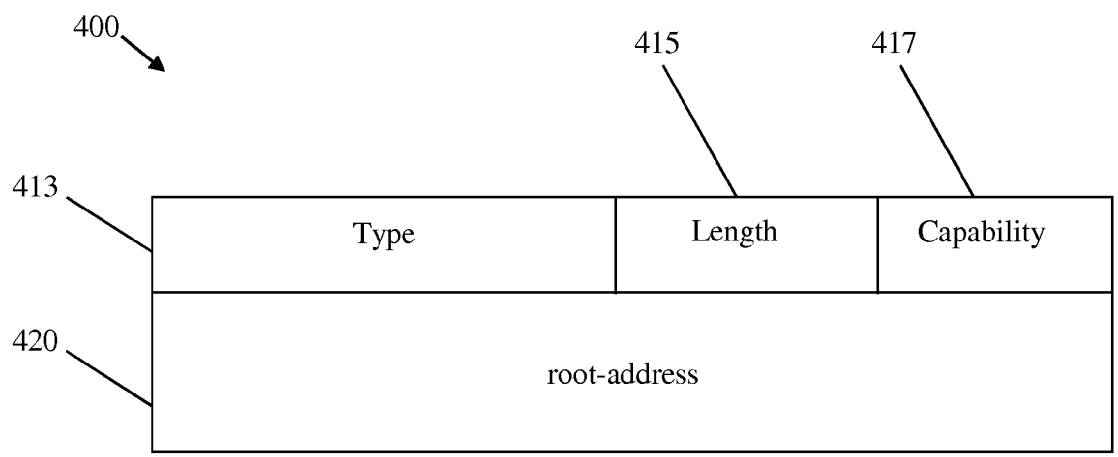
FIG. 5 is an illustration of one embodiment of a second element type.

FIG. 5 is an illustration of one embodiment of a second element type 400, which may be used to identify a root node of an mLDP. The element type 400 comprises type 413, length 415, and capability 417 fields as well as a field 420 comprising a root-address as shown in FIG. 5. The type field 413 may be a number assigned by the TANA. The type field 413 may be used to indicate that the message comprises a second element type 400. The length field 415 may be used to indicate the length (in bits or bytes) of the element type 400, excluding the type and length fields 413 and 415, respectively. The capability field 417 may be used to indicate P2MP or MP2MP capability according to RFC 6388. The root-address field 420 may comprise a root node address used to identify a root node address of an mLDP.

All or part of the first and second element types 300 and 400, respectively, may be included as part of a single LDP multipoint (MP) Status Value Element for notifying upstream and/or downstream LSRs about the LSR-ID and root address of an mLDP. For example, element types 300 and 400 may be included in a notification message transmitted from an mLDP LSR to establish an mLDP LSP according to method 200 in FIG. 2. The MP Status Value Element may use what is defined in RFC 6388 by adding first and second element types 300 and 400, respectively, as additional element types. For example, the element types 300 and 400 may be included in the value field of an LDP MP Status type-length-value (TLV), which complies with RFC 6388. A type field, such as type fields 313 or 413, may indicate that the message carries an LSR-ID and/or root address.

Figure 6:
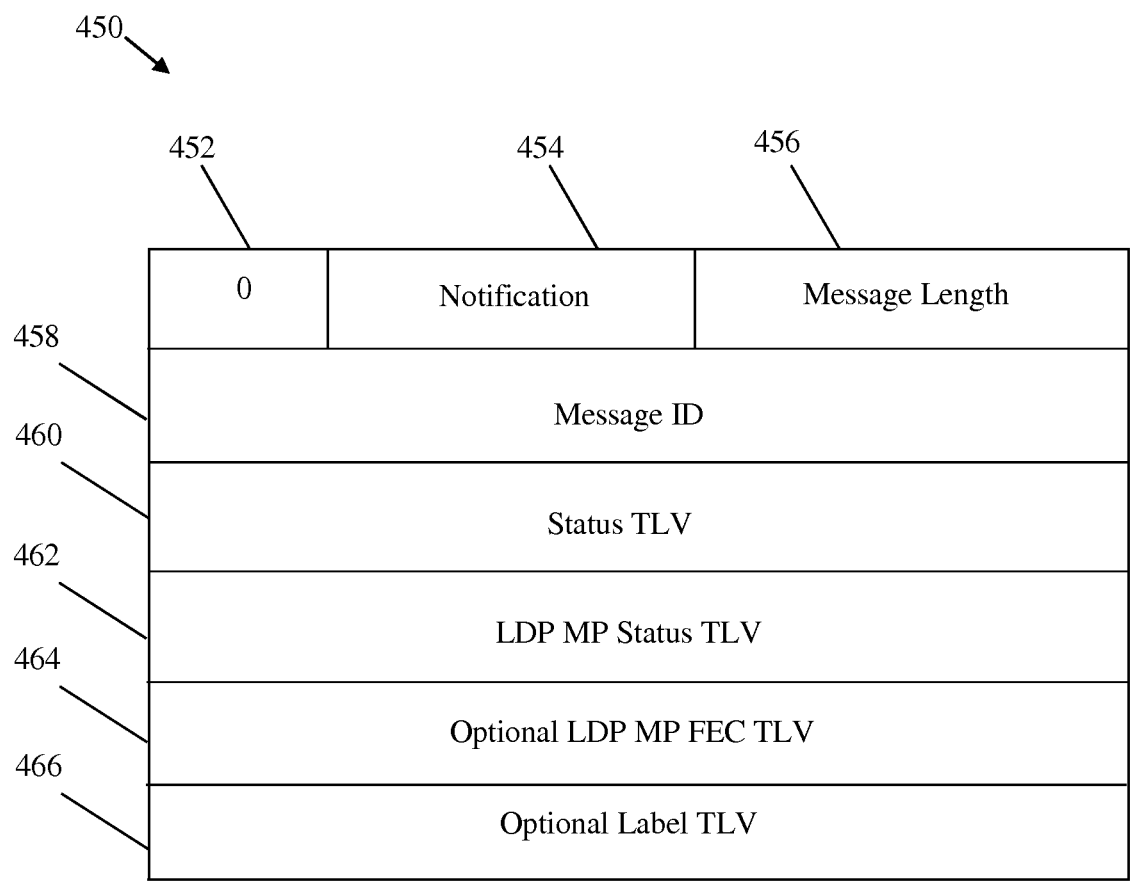
FIG. 6 illustrates an embodiment of a notification message.
Figure 7:
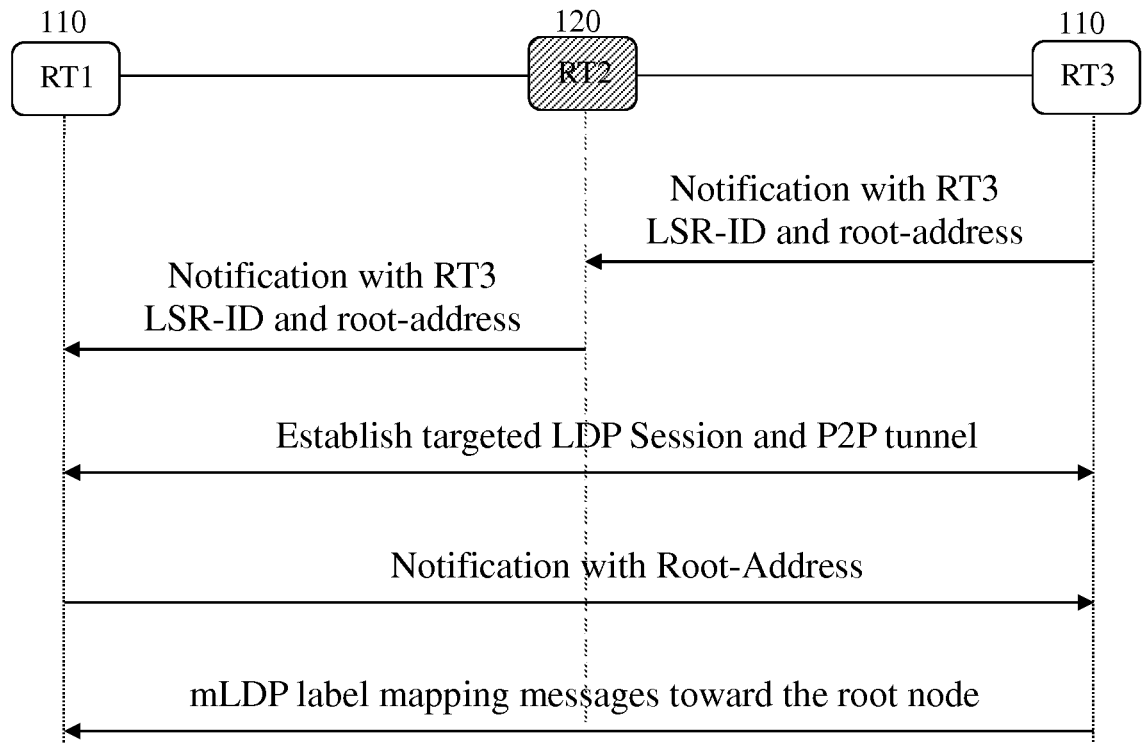
FIG. 7 is an illustration of signaling for establishing an mLDP LSP through a P2P tunnel.

FIG. 6 illustrates an embodiment of a notification message 450. The notification message 450 comprises a leading bit equal to zero 452, a notification field 454, a message length field 456, a message ID field 458, a Status TLV 460, an LDP MP Status TLV 462, an optional LDP MP Forwarding Equivalence Class (FEC) TLV 464, and an optional Label TLV 466 as shown in FIG. 7. The notification message 450 may be described at least in part according to Section 5.2.1 of RFC 6388. As discussed above, the notification message may comprise an LDP MP Status TLV 460. The LDP MP Status TLV may comprise element types 300 and/or 400 in its value field. The remaining TLVs and fields may be defined in RFC 6388.

Suppose a target session between two mLDP-capable LSRs has been setup and there is a subsequent route change. As a result of the route change, a downstream router of these two LSRs may have a new upstream router to the root of the mLDP LSP. The downstream router may treat this scenario similar to a conventional reroute cases. If there is no make before break (MBB) or MBB is not supported, then the downstream router will delete the LSP setup through the target session and then delete the target session. If MBB is supported, the downstream router may setup the new LSP first and then delete the existing LSP using the MBB procedures.

FIG. 7 is an illustration of signaling for establishing an mLDP LSP through a P2P tunnel. First, mLDP LSR 110 (i.e., RT3) sends a first notification message to P2P LSR 120 (i.e., RT2). The first notification message may be the same as notification message 450 in FIG. 6 and may contain the LSR-ID of mLDP LSR 110 (RT3) and the root address. P2P LSR 120 forwards the first notification message to mLDP LSR 110 (i.e., RT1). In response to receiving the first notification message, mLDP LSR 110 (RT1) establishes a targeted LDP session and P2P tunnel to mLDP LSR 110 (RT3). Then mLDP LSR 110 (RT1) send a second notification message with root address via the P2P tunnel. The second notification message may be used to inform mLDP LSR 110 (RT3) to consider mLDP LSR 110 (RT1) as its upstream router. Finally, mLDP LSR 110 (RT3) begins sending mLDP label mapping messages toward the root node. The label mapping message may be used to distribute an mLDP label through the targeted LDP session. P2P labels, such as La and Lb in FIG. 2., may be distributed through directed LDP sessions between mLDP LSR 110 (RT3) and P2P LSR (RT2) and also between P2P LSR (RT2) and mLDP LSR (RT1).

Figure 8:
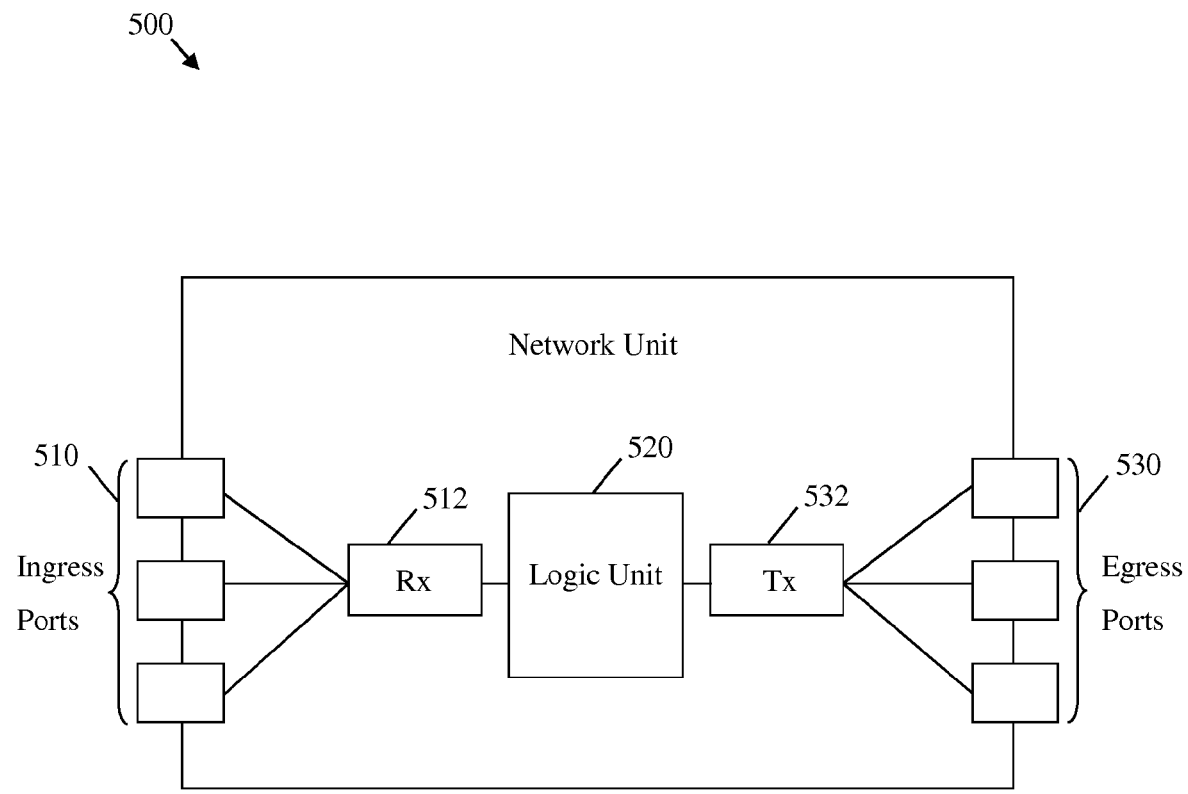
FIG. 8 is a schematic diagram of an embodiment of a network unit.

FIG. 8 illustrates an embodiment of a network unit 500, which may comprise any node or LSR discussed previously. The network unit 500 may comprise a plurality of ingress ports 510 and/or receiver units 512 for receiving data, logic unit or processor 520, and a plurality of egress ports 530 and/or transmitter units 532 for transmitting data. Network unit 500 may be configured to implement any of the schemes described herein, including one or more steps of method 200 and may be implemented using hardware, software, or both. Network unit 500 may comprise an mLDP node, such as mLDP nodes 110 in FIG. 1, or a P2P LDP node, such as P2P LDP node 120 in FIG. 1.

Figure 9:
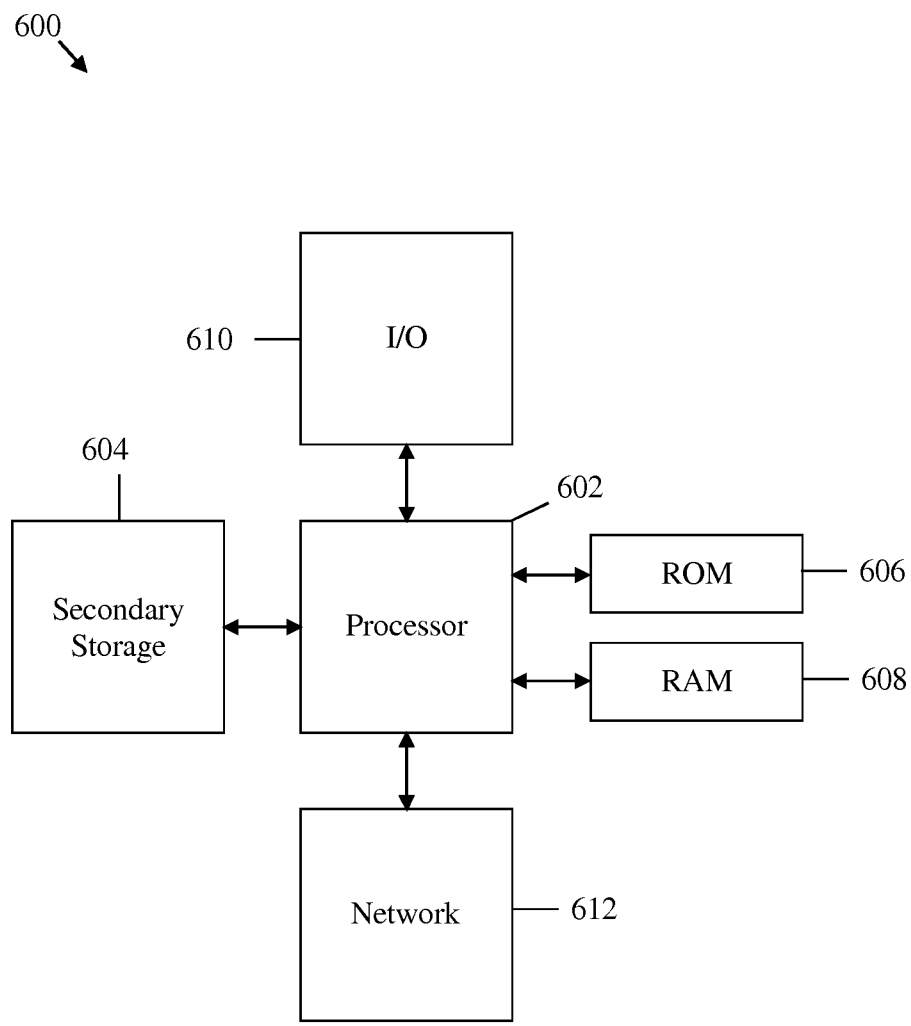
FIG. 9 is a schematic diagram of an embodiment of a general-purpose computer system.

The schemes described above may be implemented on any general-purpose network component, such as a computer or network component with sufficient processing power, memory resources, and network throughput capability to handle the necessary workload placed upon it. FIG. 9 illustrates a typical, general-purpose network component or computer system 600 suitable for implementing one or more embodiments of methods disclosed herein, such as one or more steps of method 200. The general-purpose network component or computer system 600 includes a processor 602 (which may be referred to as a central processor unit or CPU) that is in communication with memory devices including secondary storage 604, read only memory (ROM) 606, random access memory (RAM) 608, input/output (I/O) 610 devices, and network connectivity devices 612. The processor 602 may be implemented as one or more CPU chips, or one or more cores (e.g., a multi-core processor), or may be part of one or more application specific integrated circuits (ASICs) and/or digital signal processors (DSPs). The processor 602 may be configured to implement any of the schemes described herein, including one or more steps of method 200, which may be implemented using hardware, software, or both. General-purpose network component or computer system 600 may comprise an mLDP node, such as mLDP nodes 110 in FIG. 1, or a P2P LDP node, such as P2P LDP node 120 in FIG. 1.

The secondary storage 604 is typically comprised of one or more disk drives or tape drives and is used for non-volatile storage of data and as an over-flow data storage device if RAM 608 is not large enough to hold all working data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage. The RAM 608 is used to store volatile data and perhaps to store instructions. Access to both ROM 606 and RAM 608 is typically faster than to secondary storage 604.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k^*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
a transceiver; and
a processor coupled to the transceiver and configured to:
establish communications with a non-multipoint Label Distribution Protocol (non-mLDP) label switch router (LSR) via the transceiver, wherein the non-mLDP LSR does not support multipoint Label Distribution Protocol (mLDP), and wherein the non-mLDP LSR is positioned between an mLDP LSR and the apparatus;
send a first notification message to the non-mLDP LSR to discover the mLDP LSR;
receive a second notification message from the mLDP LSR;
establish an mLDP Label Switch Path (LSP) with the mLDP LSR via the non-mLDP LSR in response to receiving the second notification message; and
send a packet to the mLDP LSR via the non-mLDP LSR, wherein the packet comprises a first point-to-point (P2P) label and a mLDP label, and wherein the non-mLDP LSR replaces the first P2P label with a second P2P label, without changing the mLDP label, prior to forwarding the packet to the mLDP LSR.

2. The apparatus of claim 1, wherein the first notification message comprises an identifier of the apparatus and an address of a root LSR, and wherein at least part of the second notification message came from the mLDP LSR.

3. The apparatus of claim 2, wherein the first notification message further comprises a first LDP multipoint (MP) Status type-length-value (TLV), and wherein a value field of the first LDP MP Status TLV contains the identifier of the apparatus and the address of the root LSR.

4. The apparatus of claim 3, wherein the second notification message comprises a second LDP MP Status TLV, and wherein a value field of the second LDP MP Status TLV contains the address of the root LSR.

5. The apparatus of claim 4, wherein the mLDP LSP includes the apparatus, the mLDP LSR, and the root LSR, wherein the non-mLDP LSR is a P2P bridge between the apparatus and the mLDP LSR, and wherein the mLDP LSR is upstream of the apparatus on the mLDP LSP.

6. The apparatus of claim 4, wherein the processor is further configured to participate in establishing a targeted LDP session between the apparatus and the mLDP LSR, wherein establishing the mLDP LSP comprises transmitting, via the targeted LDP session, a multipoint label for the mLDP LSP using a label mapping message, and wherein the multipoint label identifies the mLDP LSP.

7. The apparatus of claim 6, wherein the processor is further configured to receive an mLDP packet from the non-mLDP LSR, wherein the mLDP packet comprises a P2P label and the multipoint label, wherein the multipoint label is a point-to-multipoint (P2MP) or multipoint-to-multipoint (MP2MP) label, and wherein the P2P label identifies a P2P path between the non-mLDP LSR and the apparatus.

8. A method comprising:
sending, from a multipoint Label Distribution Protocol (mLDP) node that supports mLDP, a first notification message to a non-mLDP label switch router (LSR) to discover an mLDP LSR coupled to the non-mLDP LSR, wherein the non-mLDP LSR does not support mLDP;
receiving a second notification message from the mLDP node; and
establishing an mLDP Label Switch Path (LSP) with the mLDP node via the non-mLDP LSR in response to receiving the second notification message; and
sending a packet from the mLDP node to the mLDP LSR via the non-mLDP LSR, wherein the packet sent comprises a first point-to-point (P2P) label and a mLDP label, and wherein the non-mLDP LSR replaces the first P2P label with a second P2P label, without changing the mLDP label, prior to forwarding the packet to the mLDP LSR.

9. The method of claim 8, further comprising determining that the non-mLDP LSR does not support mLDP, wherein sending the first notification message is in response to the determination.

10. The method of claim 9, wherein the first notification message comprises an identifier of the mLDP node and an address of a root LSR.

11. The method of claim 10, wherein the first notification message comprises a first LDP multipoint (MP) Status type-length-value (TLV), and wherein a value field of the first LDP MP Status TLV contains the identifier of the mLDP node and the address of the root LSR.

12. The method of claim 11, wherein the non-mLDP LSR is positioned between the mLDP LSR and the mLDP node, wherein the second notification message comprises a second LDP MP Status TLV, and wherein a value field of the second LDP MP Status TLV contains the address of the root LSR.

13. The method of claim 12, wherein the mLDP node, the mLDP LSR, and the root LSR are all on the mLDP LSP, and wherein the non-mLDP LSR is a P2P bridge between the mLDP node and the mLDP LSR.

14. The method of claim 13, further comprising participating in establishing a targeted LDP session between the mLDP node and the mLDP LSR, wherein establishing the mLDP LSP comprises transmitting, via the targeted LDP session, a multipoint label for the mLDP LSP using a label mapping message, and wherein the multipoint label identifies the mLDP LSP.

15. The method of claim 14, further comprising receiving an mLDP packet from the non-mLDP LSR, wherein the mLDP packet comprises a second P2P label and the multipoint label, wherein the multipoint label is a point-to-multipoint (P2MP) or multipoint-to-multipoint (MP2MP) label, and wherein the second P2P label identifies a P2P path between the non-mLDP LSR and the mLDP node.

16. The method of claim 15, further comprising receiving an mLDP packet from the mLDP LSR, wherein the mLDP packet comprises a second P2P label and the multipoint label, and wherein the mLDP LSR is upstream of the mLDP node on the mLDP LSP.

17. An apparatus comprising:
at least one ingress port;
at least one egress port; and
a processor coupled to the at least one ingress port and the at least one egress port, wherein the processor, the at least one ingress port, and the at least one egress port are configured to:
provide a multipoint Label Distribution Protocol (mLDP) Label Switch Path (LSP) between a first mLDP Label Switch Router (LSR) and a second mLDP LSR;
receive a packet from the first mLDP LSR, wherein the packet comprises a first point-to-point (P2P) label and a mLDP label;
replace the first P2P label with a second P2P label without changing the mLDP label; and
subsequently send the packet with the second P2P label and the mLDP label to the second mLDP LSR,
wherein the first mLDP LSR and the second mLDP LSR both support mLDP,
wherein the apparatus is positioned between the first mLDP LSR and the second mLDP LSR, and
wherein the apparatus is a lightweight mLDP LSR in that the apparatus does not fully support mLDP.

18. The apparatus of claim 17, wherein the apparatus is further configured to provide a P2P tunnel between the first mLDP LSR and the second mLDP LSR.

19. A method comprising:
receiving, by a first multipoint Label Distribution Protocol (mLDP) label switched router (LSR), a capability advertisement message from a label switch router (LSR) indicating that the LSR is not compliant with Internet Engineering Task Force (IETF) Request For Comments (RFC) 6388, wherein the LSR is positioned between the first mLDP LSR and a second mLDP LSR;
sending, by the first mLDP LSR, a first notification message to the LSR, wherein the first notification message is configured to direct the second mLDP LSR to establish an mLDP Label Switch Path (LSP) with the first mLDP LSR through the LSR; and
sending, by the first mLDP LSR, a packet to the second mLDP LSR via the LSR, wherein the packet comprises a first point-to-point (P2P) label and a mLDP label, and wherein the LSR replaces the first P2P label with a second P2P label, without changing the mLDP label, prior to forwarding the packet to the second mLDP LSR.

20. The method of claim 19, wherein the first notification message passes through a plurality of other LSRs prior to reaching the second mLDP LSR, and wherein upon receiving the first notification message, the second mLDP LSR sends a second notification message to the first mLDP LSR to set up a target Label Distribution Protocol (LDP) session with the second mLDP LSR.

21. The method of claim 20, wherein the second notification message causes the first mLDP LSR to choose the second mLDP LSR for the mLDP LSP.

22. The method of claim 19 further comprising establishing the mLDP LSP between the first mLDP LSR and a root node, wherein the mLDP LSP includes the second mLDP LSR, and wherein the LSR is a P2P bridge between the second mLDP LSR and the first mLDP LSR.

23. The method of claim 22, wherein the first notification message comprises an LDP multipoint (MP) Status Value Element comprising a local LSR-identifier (ID) and an Internet Protocol (IP) address of the root node, and wherein the local LSR-ID identifies the second mLDP MR.

* * * * *